J. L. KEIL.
SAW FILING MACHINE.
APPLICATION FILED JUNE 27, 1917.
1,264,528.
Patented Apr. 30, 1918.
4 SHEETS—SHEET 1.
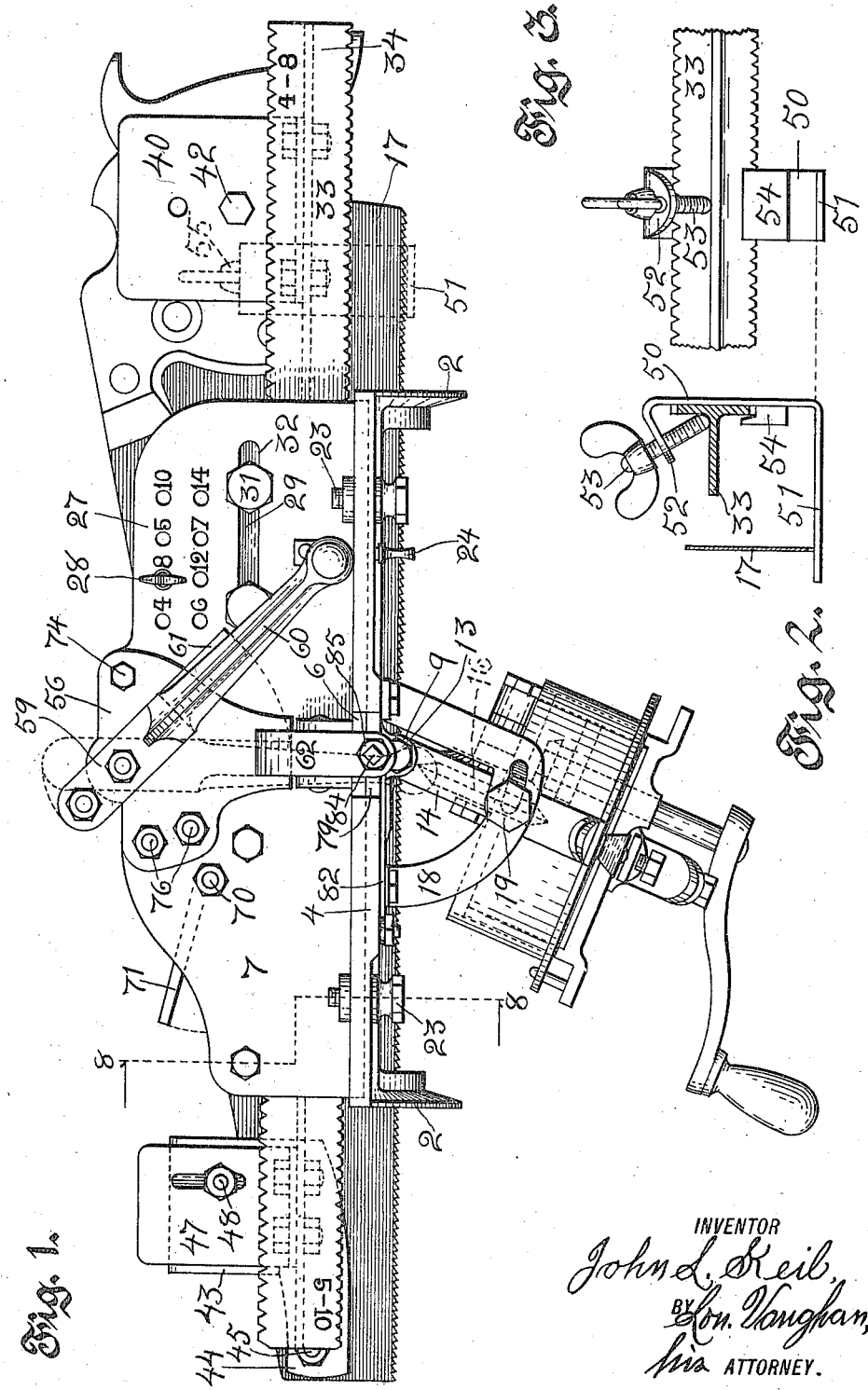
INVENTOR
John L. Keil,
BY Ion. Vaughan,
his ATTORNEY.

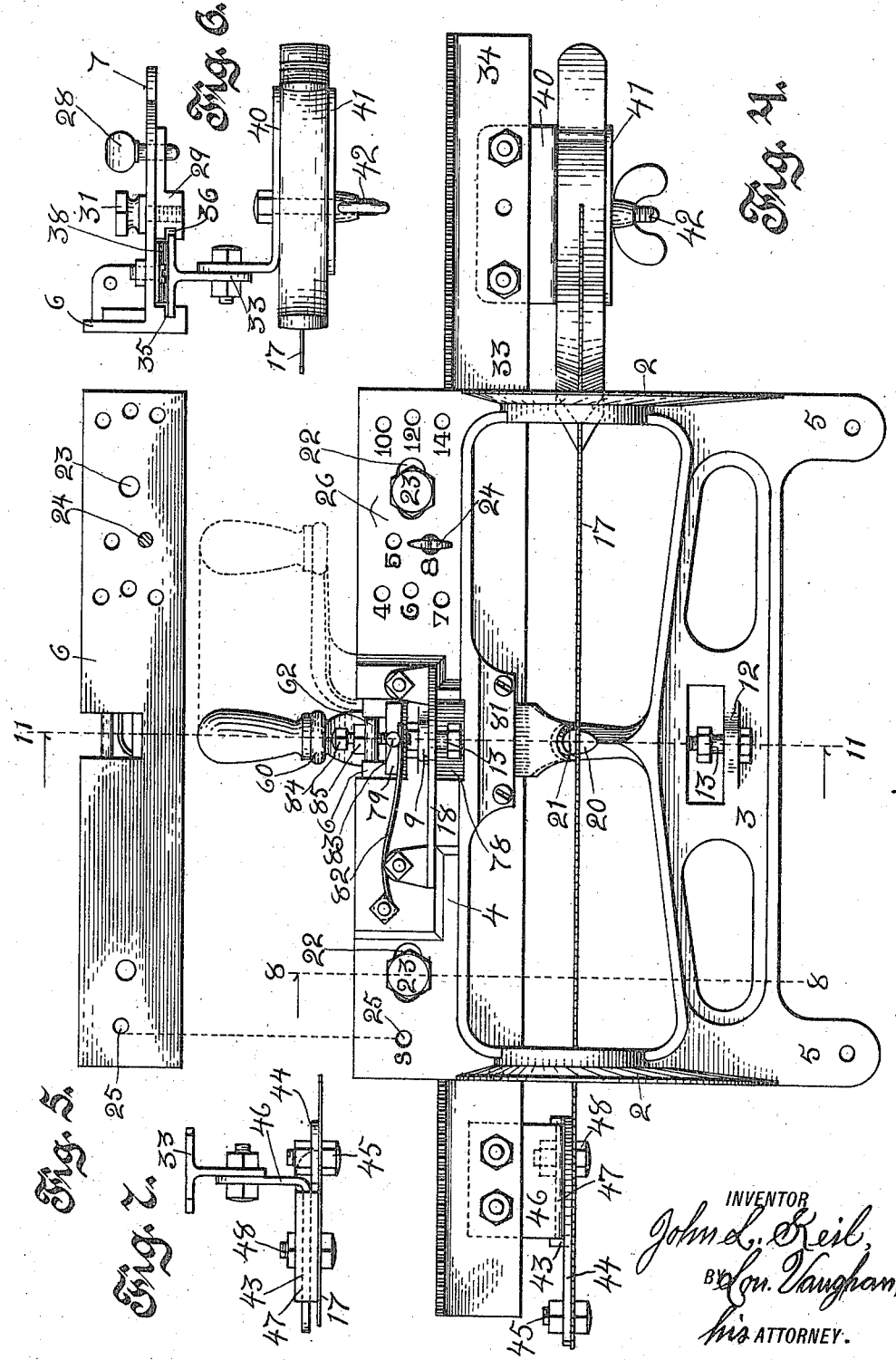

J. L. KEIL.
SAW FILING MACHINE.
APPLICATION FILED JUNE 27, 1917.
1,264,528.
Patented Apr. 30, 1918.
4 SHEETS—SHEET 3.
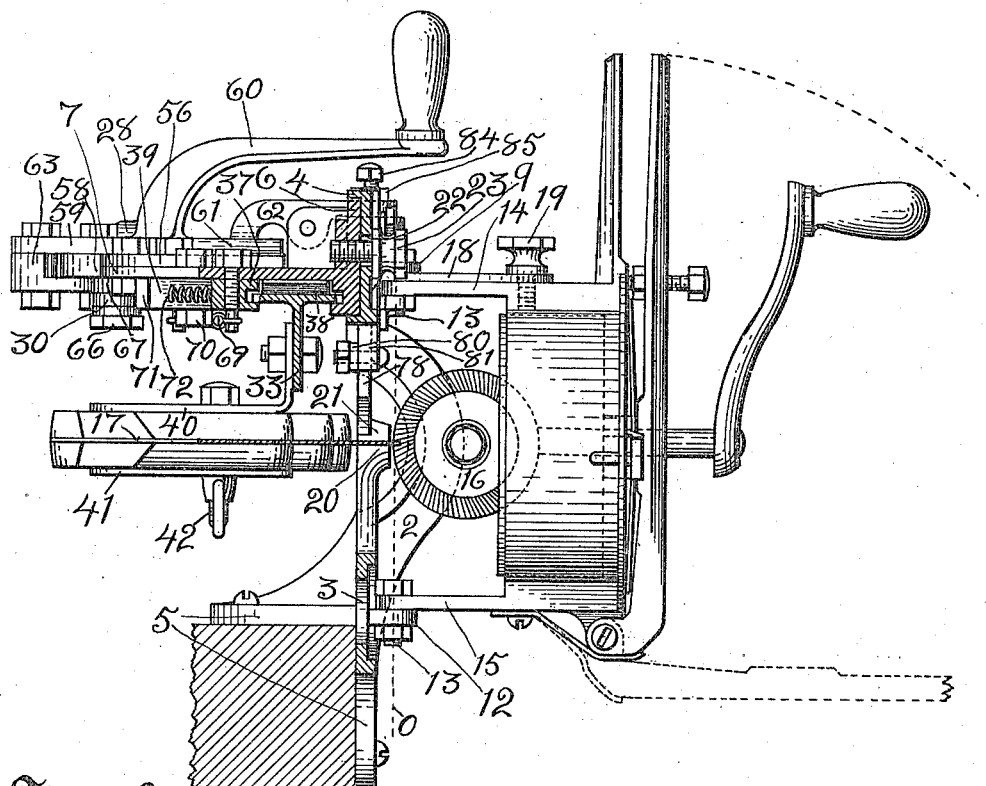
Fig. 8.
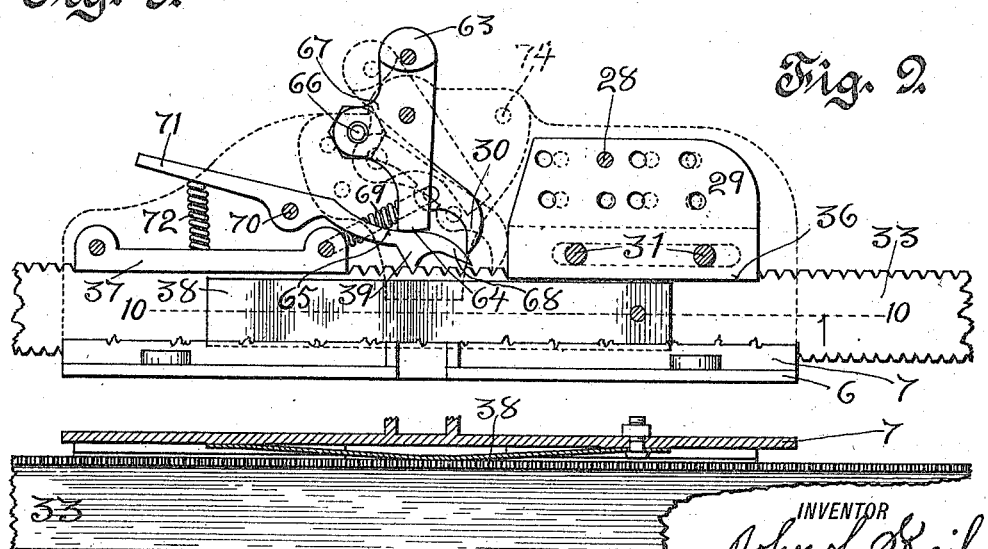
Fig. 9.
Fig. 10.
INVENTOR
John L. Keil,
BY Lou. Vaughan,
his ATTORNEY.

J. L. KEIL.
SAW FILING MACHINE.
APPLICATION FILED JUNE 27, 1917.
1,264,528.
Patented Apr. 30, 1918.
4 SHEETS—SHEET 4.
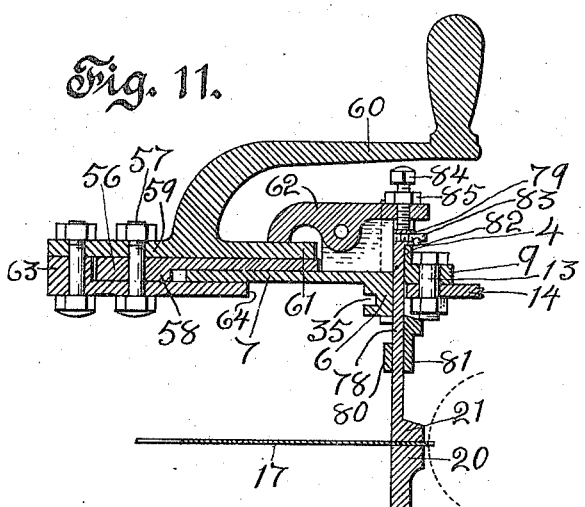
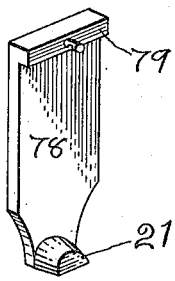
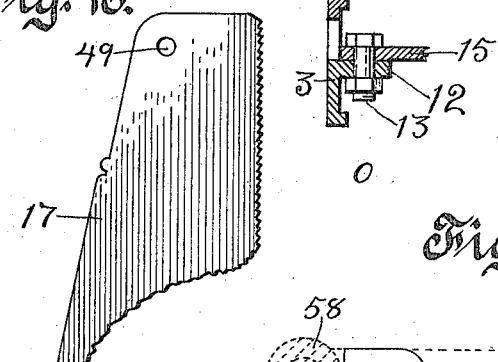
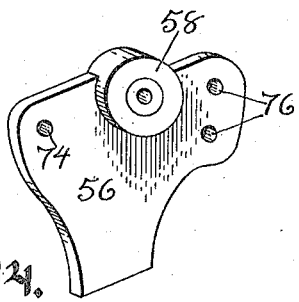
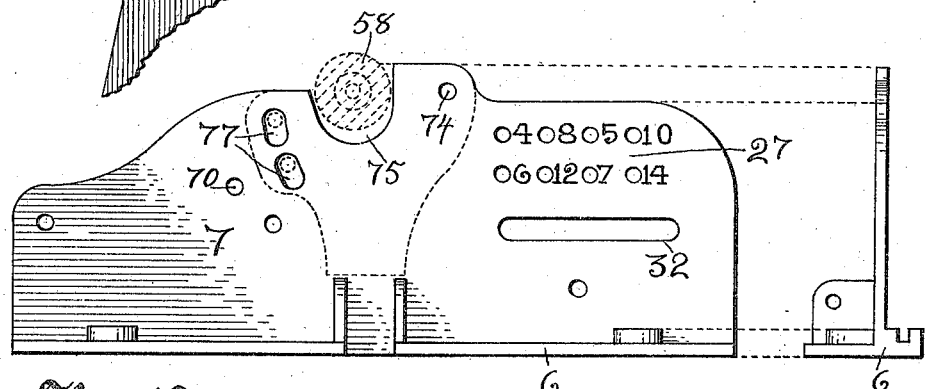
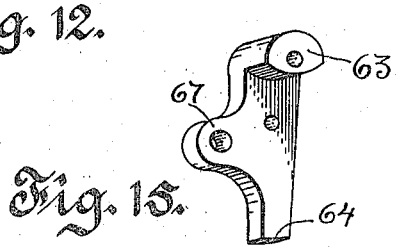
INVENTOR
John L. Keil,
BY Lou. Vaughan,
his ATTORNEY.

UNITED STATES PATENT OFFICE.

JOHN L. KEIL, OF PLAINVIEW, NEBRASKA.

SAW-FILING MACHINE.

1,264,528.　　　　Specification of Letters Patent.　　Patented Apr. 30, 1918.

Application filed June 27, 1917. Serial No. 177,353.

*To all whom it may concern:*

Be it known that I, JOHN L. KEIL, a citizen of the United States of America, residing at Plainview, in the county of Pierce and State of Nebraska, have invented certain new and useful Improvements in Saw-Filing Machines, of which the following is a specification.

My invention relates generally to improvements in that class of saw filing machines by which the toothed edge of a saw blade is longitudinally carried, in step-by-step movements according with the spacings or number of teeth to an inch of length of the saw, to receive the action of a rotary file reciprocated against and away from such toothed edge; and particularly relates to the saw-carriage, its step-by-step movement-actuating-mechanism and accordantly intermittent saw-blade clamp; and the objects of my improvement are, first, to facilitate attaching the saw in the required position on the step-movement-carriage, when said carriage is released from the step-actuating mechanism and removed from the machine; second, to provide new and more efficient means for attaching the saw to the carriage; third, to render the saw-blade clamp automatically centering as to the thickness of the saw-blade and the position of the revolving file; fourth, to provide guide-ways and an intermittent fastening lock for the saw-carriage by which the carriage will be rigidly held at a predetermined position vertically and laterally during the action of the file, but yieldably and releasably held to facilitate the longitudinal step-by-step movements and the complete separation of the carriage from the machine; fifth, to provide an arrangement of carriages each having two toothed-racks suitably nominated and arranged thereon, whereby, a single carriage will correctly carry either of four saws of differently spaced or sized teeth and allow the requisite changes to be made from one saw to another without tendency to mistakes; and, sixth, to simplify and render more efficient the step-by-step-mechanism for the carriage and the accordant intermittent saw clamp action connected therewith, than that disclosed in my U. S. Patent No. 1,072,384 of Sept. 2, 1913. These objects with others particularly set forth hereinafter, I attain by the mechanism and structure illustrated in the accompanying drawings, in which—

Figure 1 is a top or plan view of the whole machine including the file actuating mechanism set in the angular position for filing the hooked teeth of a rip saw shown fastened in the carriage for operation; Fig. 2, an end view of the detachable saw-seating gage, temporarily attached to a section of the saw-carriage bar; Fig. 3, an underside view of the same; Fig. 4, a front elevation of the machine, the filing mechanism being detached and removed from the machine frame; Fig. 5, a front elevation or seat-face of the T-head of the carriage and step-mechanism shiftable-support-plate, detached from the machine frame; Fig. 6, an elevation of the saw-handle-end of the shiftable support plate, showing a corresponding end of the T-bar carriage inserted, and the saw handle clamped thereto; Fig. 7, an elevation of the point or toe end of the saw, the corresponding end of the carriage bar and the adjusting clamp releasably fastening the saw point to the carriage T-bar; Fig. 8, an end elevation, partly in section taken on the broken line 8 of Figs. 1 and 4; Fig. 9, a top view of the carriage and its step-movement actuating mechanism, most of the shiftable support-plate broken away to reveal those parts of the device disposed thereunder; Fig. 10, a longitudinal section on the dotted line 10 in Fig. 9; Fig. 11, a central cross-section taken on the broken line 11 through Figs. 4 and 5; Fig. 12, a top and rear end view of the shiftable support-plate unassembled with other parts of the machine, and the pivot-plate indicated thereon by broken lines; Fig. 13, a perspective view of the entire upper and movable jaw of the intermittent blade-clamp removed from the machine; Fig. 14, an underside perspective view of the adjustable pivot-plate detached from the support-plate; Fig. 15, a perspective view of the oscillatory step-pawl carrier and justifying pawl-locking cam, disconnected from the pivot-plate, the operating lever and the clamp cam; and Fig. 16, a view of the perforated forward end or point of the saw blade. Like parts are referred to by the same numeral throughout all the views.

The supporting frame consisting of the end uprights 2 and 2 centrally crooked to clear the path of the saw being filed, the lower truss-shaped connecting rail 3, the top channel rail 4 and the double right-angularly disposed feet 5, is preferably an integral metal casting. The channel rail, disposed vertically edgewise forms a horizontal slideway on the back at the top of the frame to seat the T-head-base 6 of the saw-carriage-mechanism support-plate 7. The forwardly-projecting brackets, 9 on the top or channel rail and 12 on the trussed lower rail, are perforated in vertical alinement to receive the pivot bolts 13 and 13, by which the inner ends of the upper arm 14 and the lower arm 15, on the file-mechanism-support, are jointed to the front of the frame. The frame thus stands as a vertical connecting support between the file actuating mechanism and the saw-carriage step-by-step movement-actuating mechanism.

As the file actuating mechanism, only partly disclosed in these illustrations, forms the subject-matter of another application, it will suffice to say of it here:—There are means, not shown, for changing the angle of direction of cut of the rotary file 16 across the line of teeth of the horizontally disposed clamped saw blade 17 to modify the fleam of the teeth;—that the horizontally disposed bracket 18 is segmentally slotted to receive the setting screw 19, by which the file mechanism is adjusted angularly for the hookedness of teeth,—see Fig. 1; that the outer cutting edge of the file, when reciprocated inwardly to the limit, just touches the axial line 0 of the pivot bolts 13 and 13,—see Figs. 8 and 11; and, that the long pivot arms 14 and 15 are made equally slightly elastic, to any forces moving their pivotal ends toward or from each other, to render them coincidentally adjustable with the supports of the jaws of the clamp that grips the saw blade at the place of action of the file thereon, as the following will disclose:—

The tangential point, on the cutting periphery of the rotary file, of a line lying in a vertical plane, must coincide with or stand in the median plane of the thickness of the horizontally disposed clamped saw-blade to be filed; otherwise, when the rotary plane of the file is angled to the plane of the saw-blade, for much fleam, the teeth will be left uneven in size, and uneven in length on opposite sides of the filed saw. To maintain this centering adjustment for the variable and different thicknesses of saw blades clamped by the stationary lower jaw 20 and the movable upper jaw 21, I provide a construction as follows:

For the difference in thicknesses of an ordinary line of hand-saws the deflection of the top and bottom rails of the frame provides the necessary space between the jaws of the clamp to accommodate the thickest blade and still have the rails sufficiently rigid that the jaws will securely clamp the thinnest blade. The constructions of the bottom rail, and the top rail with its numerous attached elements, are such that the deflection caused by the closing clamp is substantially the same in each, and the jaws are disposed at the centers of these rails to fully produce and utilize such deflection. The upper support arm 14 of the file-actuating mechanism being secured to the bracket 9 on the top rail, by the pivoting screw 13, and the lower arm 15, in like manner secured to the bracket 12 on the lower rail, it is obvious, that, if the support rails are deflected apart by the stress from the closed clamp, the pivot ends of the support arms will likewise be deflected apart and the centering adjustment of the file and saw blade will remain undisturbed. And this automatic maintenance of adjustment holds good even when the deflections of the opposed rails are unequal. As further description will show:—the mechanism that actuates the movable jaw is all mounted on the top rail and the support-plate 7, therefore there is no bar or disturbance of this adjustment by any extrinsic force; likewise, that the saw carriage is firmly fastened to the support-plate only at the end of a step movement, by mechanism also mounted on the support-plate, acting at right angles to the force that closes the clamp, and only when the clamp is closed; therefore, the connections and actions of these parts do not effect the centering adjustment of the file to the saw-blade.

The mechanical and tabular means for selectively adjusting the machine to a required length of step-by-step movement of the saw carriage according with the number of teeth in a unit of measurement of the length of the saw to be filed, in principle is substantially like that of my existing patent, mentioned above, and is only briefly described here as follows:—The top rail 4, channeled on its back to seat the base 6 of the support-plate 7, for horizontal endwise sliding movement thereon, has the slots 22 and 22 to take the shanks of the fastening screws 23 and 23 threaded in corresponding apertures in said base. A set pin 24, is selectively seated in an aperture through the rail, designated by the numeral 8, in the setting shown, corresponding to the number of teeth to a lineal inch of the saw 17, shown fastened in the carriage,—see Figs. 1 and 4. The pin is also seated in the corresponding perforation in the base of the support-plate, as shown in Fig. 5, which brings the support-plate to a position in which the step mechanism thereon will set the carriage with the carried saw correctly to the file, for the second or finishing side of the filing. It being understood that for each side of the saw or each time throughout the length of the saw, the file only operates in every other or alternate gullet or space between the teeth, such as have the same angle of fleam. The file is then reversed in fleam-angle for the alternate gullets or spaces which were skipped the first time over; each step movement always being a distance equal to the size of two saw teeth. For the first side or first time through, the set pin is inserted in the corresponding perforations 25 on the opposite ends of the channel rail and plate base, designated by the letter S on the front face of the rail, signifying starting position; this applies as first position of the support-plate for all saws, of any size or spacing of teeth; as the notches or teeth on the selected saw-carriage racks control the length of steps. But for the second or finishing side the support-plate must be positioned by selecting from the table of perforations 26, that one designated by a numeral corresponding with the number of teeth to the inch on the saw to be filed and placing the set-pin in such perforation then turning the fastening screws home. A similar tabulation of perforations 27 on the support-plate and a set-pin 28, serve by like selection to set the stop-plate 29,—see Figs. 1, 6 and 9,—which limits the action of the carriage-moving or stepping pawl 30, at the end of each step movement,—as indicated by dotted lines in Fig. 9. Such adjustment is always to be made to tabularly accord with that by which the support-plate is positioned. This stop plate is fastened in the selected positions by the screws 31 disposed through the slot 32 in the support-plate.

The new T-bar saw-carriage 33, is toothed or notched on both edges of its head or flange part, as shown in Figs. 1 and 9. The horizontally disposed head slides longitudinally in the guideways on the under side of the support-plate and may be reversed to bring either rack edge toward the step-actuating mechanism disposed to engage the back edge or rack. The back edge on the T-head of the carriage shown, is notched in spaces equal to two teeth of the saw shown inserted. Therefore, the step mechanism set to the tabulated positions, as shown in the illustrations, will move alternate gullets or spaces of this saw to the file, as desired. This disposition of the carriage is also right for a saw having half the number of teeth to an inch in length, viz: four teeth instead of eight as shown. For this, the set pins are shifted to perforations designated by the numerals 4 of the tables on the machine. Thus adjusted, the step mechanism will act at each impulse over two teeth or notches of the rack, bringing the alternate gullets or spaces of such a saw to the file. For convenience and correct operation the tabular numerals 4—8 pertaining to this rack edge are stamped right-side up on the starting end 34 of the carriage and the handle or heel end of the saw is always disposed at the same end thereunder, as shown. Reversing this carriage bar, the opposite notched edge is disposed for engagement by the step actuating mechanism, the tabular numerals 5—10 pertaining to this edge are orderly disposed for this starting end of the carriage and by shifting the set pins to the correspondingly designated perforations of the tables, saws of five or ten teeth to the inch will be filed. From this it is apparent that saws of four different sizes of teeth can be filed by the use of this one carriage bar. Having another carriage bar with graduated notches designated by the tabular numerals 6—12 at the starting end on one rack edge and the opposite edge and end graduated and designated by the tabular numerals 7—14, I have filled the complement of tabulation shown on the machine and are able by this provision to file saws of eight different sizes or spaces of teeth. This covers the range of sizes of teeth in handsaws as generally used, by employing only two interchangeable carriage bars.

The front edge of the carriage bar head plate slides loosely in the groove 35 in the lower branch of the base of the support-plate. A thickened grooved edge 36 on the stop-plate and a grooved guide bar 37 at the opposite end of the support-plate supply guide-ways for the back edge of the carriage. The long thin spring 38 is disposed longitudinally in the space between the top of the carriage-bar and underside of the support-plate to which one end of the spring is fastened. This serves to yieldingly press the carriage down to a desired predetermined position, but allows it to be fitted loosely for free endwise sliding. And the justifying pawl 39 forces the carriage laterally into the front guide-groove 35 following each step movement,—as will be hereinafter further described,—thus co-acting with the spring above, continuously correcting and retaining the carriage in perfect lateral and vertical adjustment to the file.

For removably fastening the saw on the step-by-step movement carriage, the heel or handle end is secured by the angular-shaped sheet-metal bracket 40, having an upstanding leg bolted to the side of the web or stem of the T-bar carriage. The horizontal plate-leg of the bracket is imposed on the flat side of the wooden saw-handle, a corresponding plate 41 beneath the handle and a thumb-nutted bolt 42 disposed through these plates and the handle hand-hole, fasten this end sufficiently secure. For the toe or point of the saw-blade a more efficient attachment consists of a channel plate 43 the channel disposed across the top of the carried saw-blade. An integral arm 44 has a vertical perforation, and a corresponding perforation through the saw-blade receives the close-fitted bolt 45 to removably secure the channel disposed across on the saw-blade and projecting beyond the back thereof. The flatwise-bent sheet metal bracket 46 has a vertical leg bolted to the web or stem of the T. The horizontal leg 47 is close-fitted to slide in the lateral channel and is provided with a longitudinal slot to receive the fastening bolt 48 standing up from the web of the channel. This slotted connection and the oblong hand hole in the handle allows the saw-blade to be adjusted laterally on the carriage toward or from the file. And the perforation 49 through the saw-blade, once it is made, always brings the saw to correct endwise adjustment on the carriage; and it also serves as a convenient loop-hole for suspending and hanging up the saw when not in use.—See Fig. 16.

To facilitate attaching the saw-blade to the carriage, when the carriage is, for convenience, removed from the machine, and to attain in so doing the correct lateral adjustment of the blade on the carriage, I have provided the placing gage illustrated in Figs. 1, 2 and 3:—An oblong plate of metal has an intermediate base portion 50, substantially straight. An end portion is bent at right-angles to said base to form the gaging or placing tongue 51. The opposite end is bent in the same direction from the base, but bent further, to an angle inclined toward the gaging tongue, to form a perforated threaded lug or car 52, to receive the inclined thumb-screw 53, to engage the back inner angle of the inserted T-bar 33, as shown, and draw the hooked rest 54 on the inner face of the base, against the forward rack edge of the carriage T-bar; thereby fastening the gage on the bar. The saw is then fastened on the carriage and adjusted thereon by bringing the teeth points against the inner face of the tongue, as shown in Fig. 2 and indicated by dotted lines 55 in Fig. 1. This placing gage will be shifted to the opposite end of the carriage T-bar to complete the placing of the saw-blade, will be reversed on the bar for using the opposite edge rack and removed from the carriage-bar during the operation of filing, so as not to obstruct a full run of the carriage in its guide-ways.

A furcate oscillatory driver is mounted astride the back edges of the support-plate and the adjustable pivot-plate 56 disposed centrally across the top of the support-plate. Citing Figs. 11 and 13, the pivot bolt 57 is disposed vertically through that part of the pivot-plate having the boss 58 beneath, to give ample bearing for the bolt and fill a space in the furcation, of depth to loosely span and receive both plates. The upper branch of the driver consists of a base-plate 59, and its forward extension bears the integral operating lever 60 by which this driver of the step-by-step actuating mechanism is manually operated. The forward end portion 61 is reduced on top to a thin edge to act as a face cam to swing and wedge under and raise the back end of the lever 62, the opposite end of which depresses and closes down the movable top jaw 21 of the intermittent saw-blade clamp. An opposite backward extension of this upper branch of the driver receives a vertical bolt through the upstanding boss 63 on a corresponding rear extension of the under branch, to secure the base of the branches rigidly together in the required parallelly spaced relation, as shown. The front end of this under branch is a peripheral cam 64,—see Fig. 9,—engaging the back of the justifying and locking pawl 65, to force it and the engaged carriage bar forward into a set position, by a reverse or return swing of the lever after each step movement. The step pawl 30 is disposed across beneath and has its pivot end mounted on the wrist-pin-screw 66 seated in a lateral branch 67 of said under branch of the driver, as shown. The point of the step pawl is retained out of engagement with the carriage rack, while the justifying pawl is correcting the position of the carriage and retains it fastened, by the curved fence extension 68 on the justifying pawl. The coil spring 69 is connected to continuously draw the point of the step pawl into engagement with the carriage rack or against said fence. The justifying pawl pivoted by the pivot-screw 70, has an opposite extension 71 standing beyond the back edge of the support-plate for manually disengaging the pawl. A compressed spring 72 interposed between this handle extension and the adjacent carriage guide-bar 37, retains the justifying pawl normally in engagement with the carriage rack. If the step mechanism driver is returned to an intermediate position of its movement, forward pressure on the handle end 71 will throw the justifying pawl out of engagement with the rack, the fence on this pawl will simultaneously carry the step pawl out of engagement and the carriage released may then be drawn out of or freely inserted in its guide-ways without wearing the points of the pawls.

The adjustable pivot-plate 56, on which the oscillatory driver is mounted, facilitates taking up lost motion caused by wear, especially that of the peripheral cam against the inclined curved back 65 of the justifying pawl. It is obvious that a forcible rigid locking must be effected and maintained at this point during the file-action, without carrying the movements of the other connected elements too far beyond a completion of their functions. This pivot-plate is itself pivoted on the support-plate by the vertically disposed pivotal bolt 74. Its downwardly disposed boss 58 is disposed to swing forward in the clearance notch 75 on the back edge of the support-plate, see Fig. 9, to move the pivot of the oscillatory driver forward toward the back of the justifying pawl. On the edge of the pivot-plate, opposite to its pivotal point, the two bolts 76 are disposed down through the slots 77 in the support-plate to secure the pivot-plate at any position of adjustment.

The body of the movable jaw 21, see Fig. 13, is an oblong rectangular plate 78, having a forwardly-disposed head 79. It is fitted to slide endwise in a vertical channel on the back of the top rail 4 of the machine frame, the face of its head standing flush with the front of the rail and is retained therein by the base 6 of the support-plate and by the lower back-plate 80, fastened across by screw-bolts, disposed through the central drop 81 at the center of the rail, as shown. A wire spring 82 fastened on the face of said top rail has its free end set to engage under the stud 83 on the head, to normally and yieldingly support the jaw slid upwardly and open. An adjusting screw 84, provided with a jam-nut 85, is threaded vertically through the forward end of the lever 62 to engage the top of the head 79 to force the jaw 21 downwardly, when the face cam 61 of the driver slips under and raises the back end of said lever.

The moving parts are so constructed and timed that in operation the intermittent saw-blade clamp is released while the saw carriage is driven a step; after which, the justifying pawl is thrust forward and locked by the peripheral cam, to correctly seat and fasten the carriage, just a little before the face cam engages the lever that closes the clamp, at the end of the return movement of the driver.

I claim:

1. A saw filing machine comprising clamp jaws, suitable means to close the jaws on a saw-blade, and opposite supports for said jaws adapted to deflect to adjust the closed jaws to saw-blades of different thicknesses, in combination with a filing mechanism having opposite support arms connected to said opposite jaw supports and adapted to deflect therewith, whereby, the alinement of the file with the median planes of clamped saw-blades of different thickness is automatically adjusted and maintained.

2. A saw filing machine, having in combination a suitable file-actuating mechanism, projecting spaced supporting arms to carry said filing mechanism, support rails spaced apart and each having a central connection to one of said support arms, a stationary saw-clamp-jaw disposed centrally on one of said support rails, an opposed movable clamp-jaw mounted centrally on the opposite support rail, and suitable mechanism connected to close and open said movable jaw.

3. In a saw filing machine, a carriage-bar having a toothed rack on one edge of pitch equal to two teeth of a saw of eight teeth to an inch of length, whereby it is adapted to be moved steps of two teeth of said rack for properly stepping saws of four teeth to an inch of length, and said rack nominated and designated by marking on the top of one end of said carriage bar, as 4—8; the carriage bar adapted to be reversed, end-for-end, edge-for-edge, and having on its opposite edge a toothed rack of different pitch nominated and designated on the top of the opposite end of said carriage bar, as 5—10, whereby saws of four different sizes or spacings of teeth, viz:—four, eight, five and ten teeth to an inch of length may be correctly stepped for filing, by a single carriage bar, in combination with a suitable guideway to slidingly receive the carriage, a reversible shiftable fastener to releasably attach a saw to the carriage in accordance with the selected nominated and designated rack thereon, and selectively variable step-by-step driving means to engage the rack.

4. In a saw filing machine, a carriage-bar having its opposite lateral edges provided with toothed racks of different pitches, said bar adapted to be reversed, end-for-end and laterally edge-for-edge, in its guideways, to bring either rack into engagement with step-by-step actuating mechanism, the pitch of each rack being equal to two teeth of a saw of a certain number of teeth in an inch of its length, and each rack adapted to be moved steps of two of its teeth for saws having larger teeth or one-half the number of teeth in an inch of its length, in combination with a suitable guideway to slidingly carry the carriage-bar, means to releasably attach a saw to said carriage-bar, and step-by-step driving means to engage the selected rack.

5. A saw filing machine, comprising a support-plate, a saw carriage-bar, grooved guide-ways on the support-plate to slidingly carry said carriage-bar endwise and to support said carriage-bar parallel with and spaced away from said support-plate, and a spring interposed in the space between said support-plate and said carriage-bar to yieldingly press the carriage-bar against the opposed bearing sides of said guide-ways.

6. In a saw filing machine, the combination of a horizontally disposed support-plate, a saw carriage-bar, guide-ways fixed to the support-plate and grooved to loosely receive said carriage-bar for endwise sliding, a spring on the support-plate to yieldingly press the carriage-bar downwardly in the guide-ways, and a cam mounted on the support-plate and connected to horizontally and laterally grip the carriage-bar against one of said guide-ways.

7. In a saw filing machine, a saw carriage-bar, and clamps on the carriage-bar to temporarily fasten a saw thereto, in combination with a movable and detachable saw-placing guide, consisting of a base-plate, a rest on the base-plate to engage one edge of the carriage-bar, an opposed thumb-screw to oppositely engage the carriage-bar to set the base-plate separable from and movable thereon, and a projecting guide-tongue on the base to engage the toothed edge of a saw being placed in the clamps.

8. In a saw filing machine, a T-bar saw-carriage, and saw clamps fastened to the web or stem of the T-bar, in combination with a saw-placing guide, consisting of a base, a hooked rest on the base to engage one edge of the flange-head of the T-bar, an arm on the base disposed oppositely to and inclined toward said hooked rest, a thumb-screw threaded through the arm to engage the opposite inner angle of a T-bar seated in said rest, and a projecting tongue on the base to guide the toothed edge of a saw being placed in the clamps on the carriage.

9. In a saw filing machine, a saw-placing guide, comprising a base, a saw-carriage rest on the base, an angularly disposed arm standing on the base in spaced relation to said carriage rest, a thumb-screw threaded through said arm toward the carriage rest, and a saw-placing guide-tongue on the base.

10. A saw placing guide, comprising an oblong metal plate an intermediate portion straight to form an attaching base, an end portion bent flatwise to form a saw-placing guide-tongue standing at an angle from that end of said base, an opposite end portion bent flatwise to form an arm standing inclined toward the base, a hooked rest disposed on the base in spaced relation to and open toward said arm, and a thumb-screw threaded through said arm toward said hooked rest.

11. In a saw filing machine, a saw carriage, and a laterally-projecting and longitudinally-slotted bracket-arm on said carriage, in combination with a channel adapted to be disposed flatly on and across a saw blade, at right angles to its toothed edge and bolted thereto, the channel adapted to receive the slotted bracket arm for sliding adjustment therein, and a fastening bolt disposed through the web of the channel and the slot in the arm.

12. In a saw filing machine, a saw carriage and a laterally-standing longitudinally-slotted arm on the carriage, in combination with a channel adapted to receive said slotted arm for sliding adjustment therein, a fastening bolt disposed through the web of the channel and the slot in the arm, and a perforate branch on the channel adapted to receive a close-fitted bolt adapted to be disposed through a corresponding perforation in a saw blade.

13. In a saw filing machine, an adjustable saw attaching device, comprising a channel, a perforate branch on the channel to receive an attaching bolt adapted to be disposed through a like perforation in a saw-blade to be filed, a bracket having a branch for attachment to a saw carriage and a longitudinally-slotted branch fitted for close sliding adjustment in said channel, and a setting bolt disposed through said slotted branch and through the web of the channel.

14. In a saw filing machine, the combination of a supporting frame, filing mechanism on the supporting frame, a saw blade clamp disposed on said supporting frame adjacent the filing mechanism, a support-plate having a saw-carriage guide-way and seated on said supporting frame, a saw carriage adapted to slide in said guide-way and carry a saw blade through said clamp, an oscillatory driver mounted on said support-plate, and a cam on the driver connected to close said clamp on the saw-blade.

15. In a saw filing machine, the combination of a supporting frame, an angularly disposed support-plate on the frame, an oscillatory driver mounted on the support-plate, a stationary saw-clamp jaw on said frame, an opposed spring-pressed movable jaw mounted on the frame to normally stand opened, an intermediately-fulcrumed lever mounted on the support-plate, an adjusting screw threaded through one end of said lever to engage said movable jaw, and a cam on the driver to engage the opposite end of said lever to close the movable jaw.

16. In a saw filing machine step-by-step saw carriage mechanism, a support-plate, guide-ways on the support-plate, a saw carriage slidable in said guide-ways, and a toothed rack on said saw carriage, in combination with an oscillatory driver mounted on said support-plate, and a reciprocating pawl pivoted on the oscillatory driver to engage said rack.

17. In a saw filing machine step-by-step saw carriage mechanism, a support-plate, a carriage guide-way on the support-plate, a saw carriage adapted to slide in said guide-way, a toothed rack on the carriage, and a justifying and locking pawl pivoted on the support-plate to engage in the spaces of said rack, in combination with an oscillatory driver mounted on said support-plate, and a cam on the driver to thrust the justifying and locking pawl into rigid engagement against said rack.

18. In a saw filing machine step-by-step saw carriage mechanism, a support-plate having a saw carriage guide-way, a saw carriage slidable in said guide-way, a toothed rack on said carriage, and a justifying and locking pawl pivoted on the support-plate to engage in the spaces of said rack, in combination with an oscillatory driver mounted on the support-plate, a step-pawl mounted on the driver to engage said rack, and a cam on the driver to thrust the justifying and locking pawl into rigid engagement with said rack.

19. In a saw filing machine, a saw carriage having a toothed rack, and a locking pawl to engage in spaces of the rack, in combination with an oscillatory driver, a stepping-pawl on said driver to engage the rack for step-by-step movement of said carriage, a cam on said driver to close the locking pawl into engagement of the rack by the reverse or return movement of the driver, and a fence on the locking pawl disposed in the path of the step-pawl to disengage it from the rack at the end of its return or idle stroke.

20. In a saw filing machine, a saw carriage having a toothed rack, and a spring-pressed locking pawl to normally engage said rack, in combination with an oscillatory driver, a spring-pressed pawl on the driver to normally engage the rack, means for manually disengaging and retaining the locking pawl out of engagement with the rack, and a fence on said locking pawl to simultaneously engage the pawl on the driver to disengage it and retain it out of engagement with the rack whereby the carriage is released for free manual movement.

21. In a saw filing machine, a support-plate, a saw carriage slidably mounted on said support-plate, a toothed rack on said carriage, and a justifying and locking pawl mounted on the support-plate to engage the rack, in combination with a positionally-adjustable pivot-plate mounted on the support-plate, an oscillatory driver mounted on the pivot-plate, a stepping pawl on the driver to engage said rack, and a cam on the driver to engage and close the justifying and locking pawl against the rack.

22. In a saw filing machine, a support-plate, and a saw carriage mounted for movement on the support-plate, in combination with a pivot-plate mounted positionally-adjustable on the support-plate, an oscillatory driver pivoted on said pivot-plate, and means to operatively connect the driver and carriage.

23. In a saw filing machine, a saw carriage mounted for step-by-step movements, and an intermittent saw clamp, in combination with a support-plate having a clearance notch, a pivot-plate mounted positionally adjustable on the support-plate and having a boss disposed through said clearance notch, a bifurcate oscillatory driver disposed astride of said boss, a pivoting bolt disposed across through the branches of the bifurcate driver and the interposed boss, means to operatively connect one branch of the driver with the saw carriage, and means to operatively connect the opposite branch of the driver with the saw clamp.

In testimony whereof I have affixed hereto my signature.

JOHN L. KEIL.

Copies of this patent may be obtained for five cents each, by addressing the "Commissioner of Patents, Washington, D. C."